(12) United States Patent
Koizumi et al.

(10) Patent No.: US 6,843,345 B2
(45) Date of Patent: Jan. 18, 2005

(54) DEVICE AND METHOD FOR INSTALLING VEHICLE DOOR SPEAKER

(75) Inventors: Hiroshi Koizumi, Saitama (JP); Shinji Kobayashi, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/398,624

(22) PCT Filed: Aug. 8, 2002

(86) PCT No.: PCT/JP02/08109

§ 371 (c)(1),
(2), (4) Date: Apr. 7, 2003

(87) PCT Pub. No.: WO03/018365

PCT Pub. Date: Mar. 6, 2003

(65) Prior Publication Data

US 2004/0003959 A1 Jan. 8, 2004

(30) Foreign Application Priority Data

Aug. 23, 2001 (JP) .......... 2001-252787
Sep. 20, 2001 (JP) .......... 2001-286058
Sep. 25, 2001 (JP) .......... 2001-270370

(51) Int. Cl.$^7$ .................. H05K 5/00
(52) U.S. Cl. .................. 181/150; 181/179
(58) Field of Search .................. 181/149, 150, 181/148, 151, 152, 153–157, 171, 172, 158–170

(56) References Cited

U.S. PATENT DOCUMENTS 5,606,623 A * 2/1997 Bahm et al. .......... 381/86
6,144,751 A * 11/2000 Velandia .......... 381/345
6,578,658 B2 * 6/2003 Jones et al. .......... 181/141

* cited by examiner

Primary Examiner—Kimberly Lockett
(74) Attorney, Agent, or Firm—Jay H. Maioli

(57) ABSTRACT

A speaker assembly device for a door of a vehicle capable of being installed in vehicle doors of different thicknesses and shapes includes a speaker unit; a holder for mounting the speaker unit to a front portion thereof, the holder including an engagement portion at a back portion thereof; and a spacer including an engaging portion and an opposingly contacting portion, the engaging portion being engageable with the engagement portion of the holder and the opposingly contacting portion opposingly contacting the door of the vehicle.

4 Claims, 7 Drawing Sheets

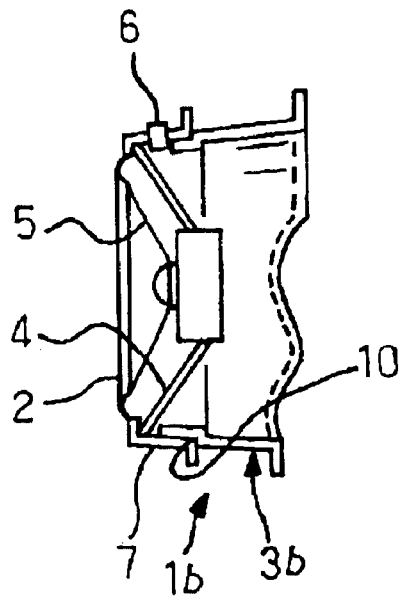
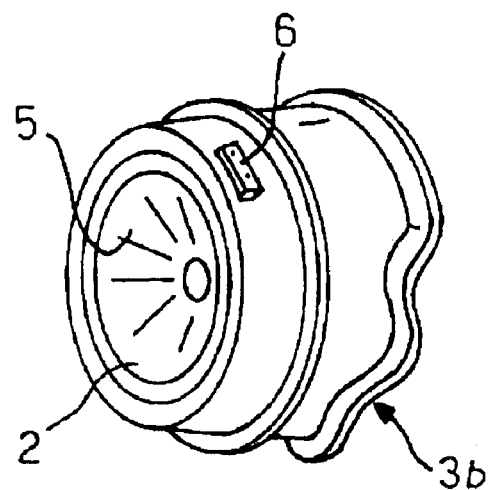
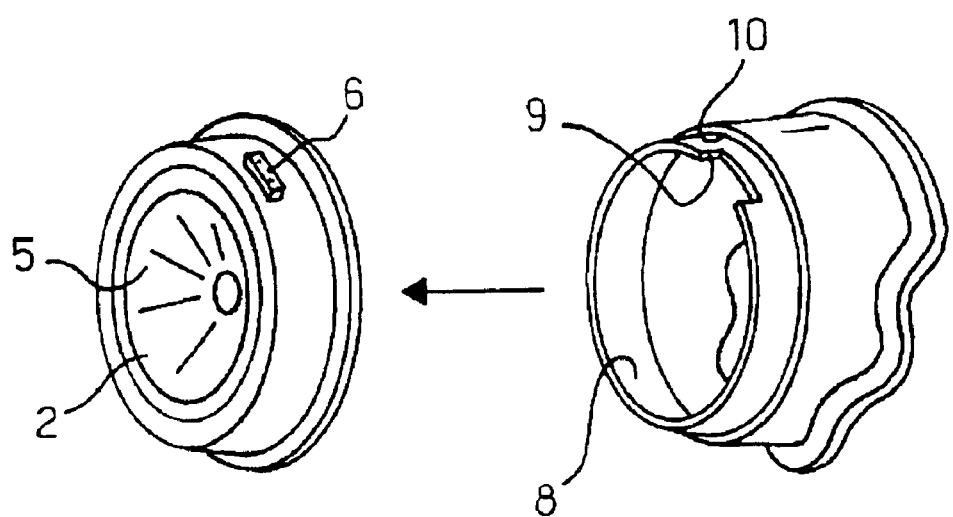

Fig.4A
Fig.4B
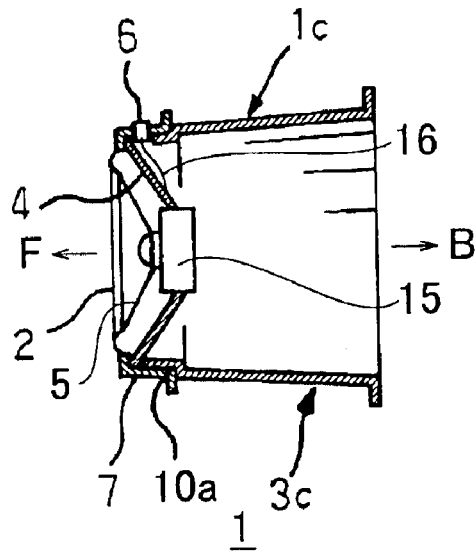
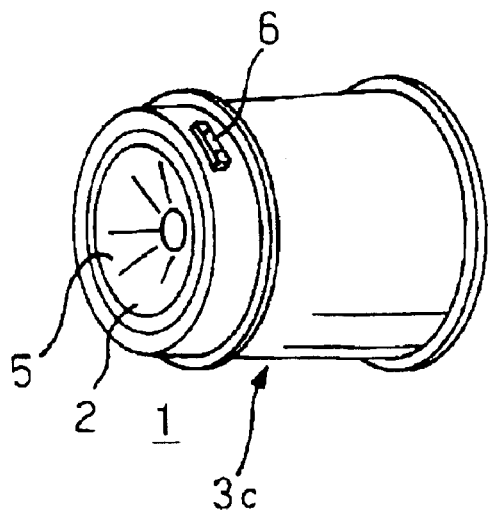
Fig.4C
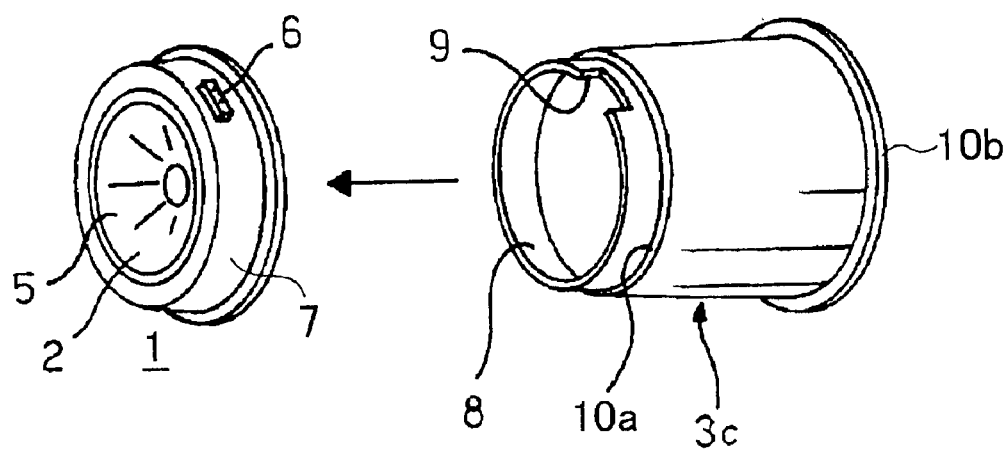

a1    b1 a1    b2 a2    b3

DEVICE AND METHOD FOR INSTALLING VEHICLE DOOR SPEAKER

TECHNICAL FIELD

The present invention relates to a speaker assembly device for a door of a vehicle and a method for mounting a speaker for a door of a vehicle, in which a speaker can be set at a low cost at vehicle doors of different thicknesses, shapes, etc., to which the speaker is mounted.

BACKGROUND ART

Doors of recent automobiles tend to be formed with increasing thicknesses, and with various thicknesses. There is a vehicle type having at a door trim board (door inner plate) a place (accommodating section) for putting, for example, a drink bottle or can.

Therefore, in particular, vehicles having a large interval between the inner plate and the door trim board of the door have thick doors. There are also vehicles with relatively thin doors, and vehicles in which the inner plate of the door is flat or curved in the form of a wave for increasing mechanical strength. Accordingly, the conditions for mounting speakers are becoming diversified.

Due to the diversification of the mounting conditions of speakers, speakers having sizes and shapes in accordance with vehicle types are designed and produced. More specifically, for example, as shown in FIGS. 7A to 7C, speaker units a1 and a speaker unit a2, which are provided according to vehicle types, are designed and produced; they are integrally mounted to their respective holders, that is, brackets b1, b2, and b3; and the resulting structures are mounted to the doors of vehicles. The speakers shown in FIGS. 7A to 7C will be described in more detail. The speaker shown in FIG. 7A is adapted for use in a vehicle type whose interval between the door trim board and the inner plate is relatively small, that is, whose door is thin, and whose mounting portion of the inner plate has a flat shape. Therefore, the speaker unit a1 is short, the bracket b1 is relatively short, and an end surface of the bracket b1 that opposingly contacts the inner plate at the back portion of the bracket b1 has a flat shape.

The speaker shown in FIG. 7B is adapted for use in a vehicle type whose door is relatively thin and whose mounting portion of the inner plate is curved rather than being flat. Therefore, the speaker unit a1 is short, the bracket b2 is short, and the back end of the bracket b1 is curved in accordance with the shape of the mounting portion of the inner plate of the door.

The speaker shown in FIG. 7C is adapted for use in a vehicle type whose interval between the door trim board and the inner plate is large and whose mounting portion of the inner plate has a flat shape. Therefore, the speaker unit a2 is long, the bracket b3 is relatively long, and the back end of the bracket b3 is flat.

The speakers shown in FIGS. 7A to 7C are only examples, so that it may be necessary to change the length of the bracket or to form the back end of the bracket with a complicated shape.

Designing and producing speakers according to vehicle types is a big factor in preventing a reduction in production costs that is strongly demanded of a speaker for a door of a vehicle, so that it is a big factor in preventing a reduction in costs that is strongly demanded of a speaker device for a door of a vehicle.

The present invention has been achieved in view of the above-described problems, and has as its object the provision of a speaker assembly device for a door of a vehicle and a method for mounting a speaker for a door of a vehicle, in which a speaker can be set at a low cost at vehicle doors of different thicknesses, shapes, etc., to which the speaker is mounted.

DISCLOSURE OF INVENTION

The present invention provides a speaker assembly device for a door of a vehicle comprising a speaker unit, a holder (bracket) for holding the speaker unit, and a spacer which is mounted to the door of the vehicle and which is engageable with the holder, or which is mounted to the holder and has an opposingly contacting portion formed in correspondence with a portion (inner plate) to which a speaker is mounted of the door of the vehicle.

According to the present invention, it is possible to reduce production costs of the speaker device for a door of a vehicle, so that costs can be reduced.

BRIEF DESCRIPTION OF THE DRAWINGS

FIGS. 3A to 3C are a sectional view, a perspective view, and an exploded perspective view, respectively, of a speaker assembly device for a door of a vehicle of an embodiment of the present invention, which is adapted for use in a second vehicle type.

FIGS. 4A to 4C are a sectional view, a perspective view, and an exploded perspective view, respectively, of a speaker assembly device for a door of a vehicle of an embodiment of the present invention, which is adapted for use in a third vehicle type.

FIG. 5A is an exploded side view thereof, and FIG. 5B is taken along a double-headed arrow B—B shown in FIG. 5A.

BEST MODE FOR CARRYING OUT THE INVENTION

In a speaker assembly device for a door of a vehicle and a method for mounting a speaker for a door of a vehicle of the present invention, a speaker unit, a holder (bracket) for holding the speaker unit, and a spacer which engages the holder and which has an opposingly contacting portion which is formed in with correspondence with a portion to which the speaker is mounted of the door of the vehicle are basically used.

Engagement between the holder and the spacer can be maintained by, for example, screwing, press-fitting, or adhesion. The engagement can be maintained by any one of these methods in the present invention.

In the present invention, a common speaker unit that is adapted for use in a plurality of vehicle types and a holder for holding the speaker unit are provided. A speaker comprising one type of speaker unit and holder is adaptable to a relatively large number of vehicle types by changing the type of spacer mounted to the speaker, so that production costs of the speaker for a door of a vehicle can be considerably reduced.

Since a connector connected to a voice coil of the speaker unit through a lead wire is provided at a peripheral side wall of the holder, even if the spacer is changed according to vehicle type, the lead wire does not interfere with the mounting and engaging operation of the holder and the spacer, so that the engaging operation can be smoothly carried out.

Hereunder, the present invention will be described in more detail with reference to the illustrated embodiments.

Figure 1A:
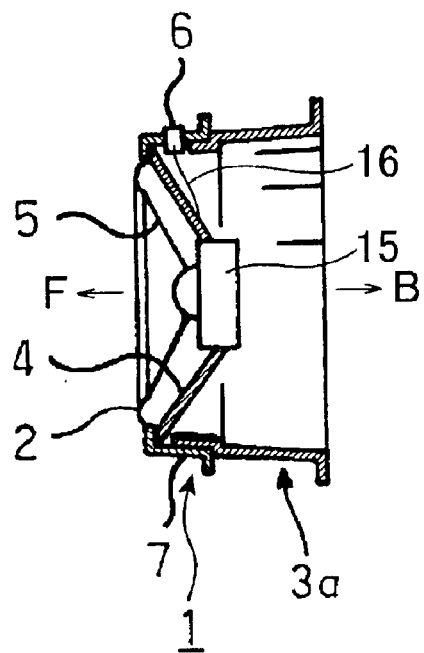
FIGS. 1A to 1C are a sectional view, a perspective view, and an exploded perspective view, respectively, of a speaker assembly device for a door of a vehicle of an embodiment of the present invention, which is adapted for use in a first vehicle type.
Figure 1B:
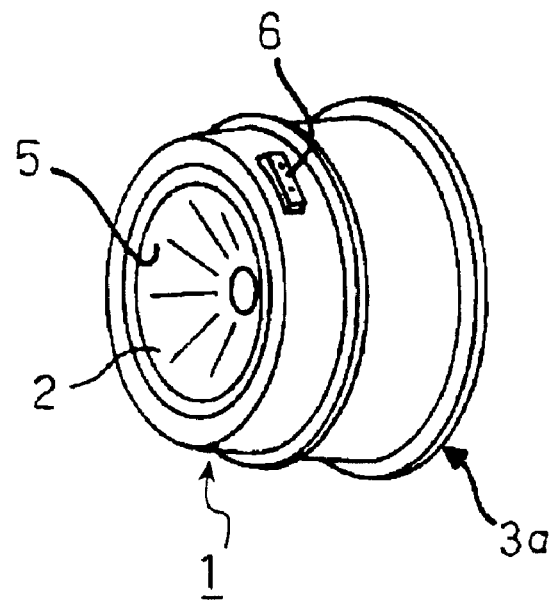
Figure 1C:
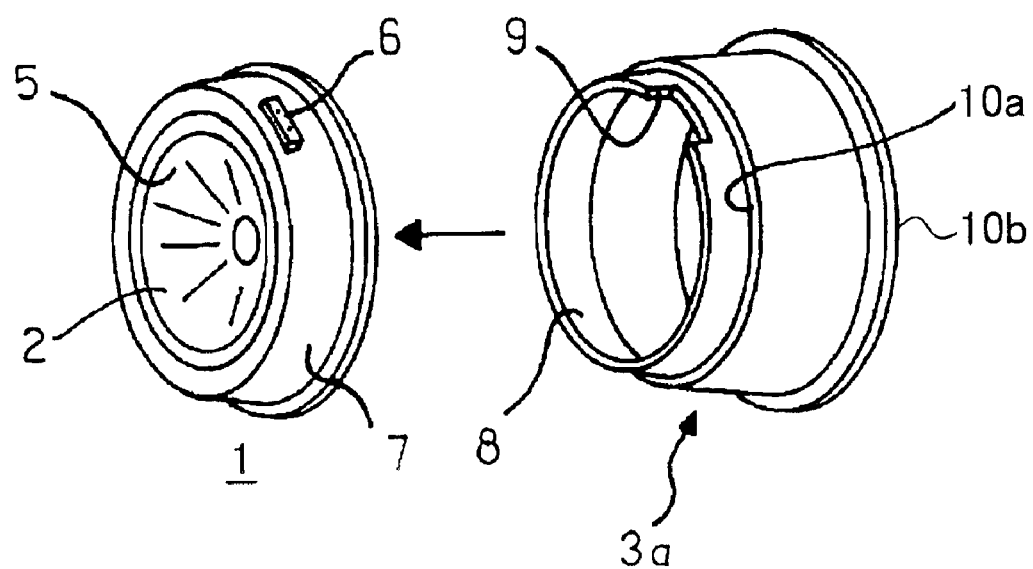
Figure 2:
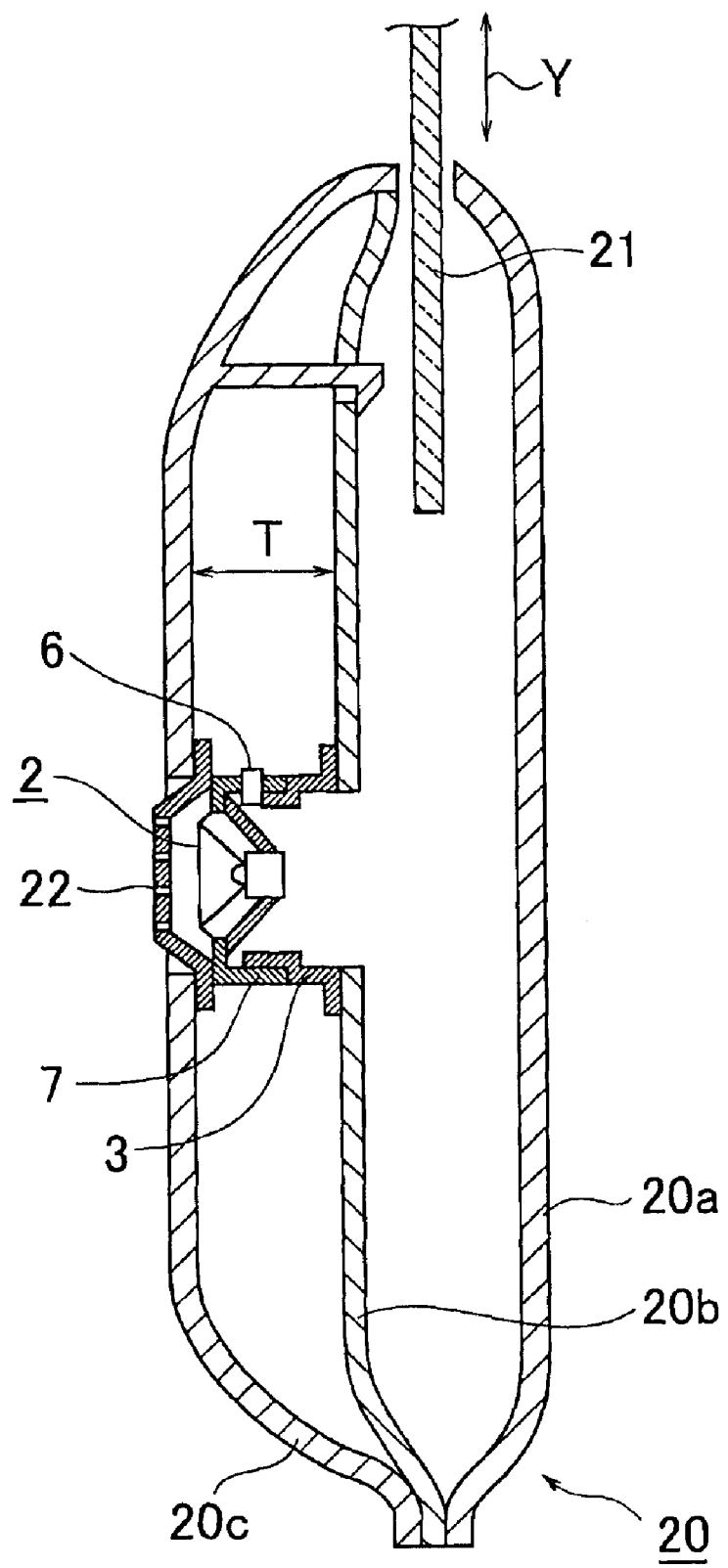
FIG. 2 is sectional view showing a state in which the speaker assembly device for a door of a vehicle of the embodiment adapted for use in the first vehicle type is mounted to the door of the vehicle.

FIGS. 1A to 1C are a sectional view, a perspective view, and an exploded perspective view, respectively, of a speaker assembly device for a door of a vehicle of an embodiment of the present invention, which is adapted for use in a first vehicle type. FIG. 2 is sectional view showing a state in which the speaker assembly device for a door of a vehicle of the embodiment of the present invention is mounted to the door of the vehicle.

In the figures, reference numeral 1 denotes a speaker assembly device for a door of a vehicle. The device 1 comprises a speaker having a common speaker unit 2 held by and integrally formed with a holder, that is, a bracket 7, and a spacer 3a designed and produced in accordance with a vehicle type to which the speaker is mounted.

Reference numeral 4 denotes a frame of the speaker unit 2, reference numeral 5 denotes a diaphragm, reference numeral 6 denotes a connector integrally mounted to the bracket 7, reference numeral 15 denotes a magnetic circuit comprising a magnet, an upper plate, a lower plate having a center pawl, and a voice coil wound upon a bobbin disposed in a magnetic gap between the upper plate and the center pawl. The bobbin is mounted to the back end of the diaphragm 5. Reference numeral 16 denotes a lead wire connecting the connector 6 and the voice coil.

When an electrical signal is input to the connector 6, an electrical current flows through the voice coil, disposed in the magnetic gap, through the lead wire 16, thereby causing the bobbin, that is, the diaphragm 5 to vibrate forwards F and backwards B, and to move the air in front of the diaphragm 5, so that a sound is produced.

The bracket 7 is formed of, for example, ABS resin (copolymer resin containing acrylonitrile, styrene, and butadiene as monomers) or PP resin (polycarbonate resin) and has a cylindrical shape. The front portion of the frame 4 of the speaker unit 2 is integrally mounted to the front opening of the bracket 7 with, for example, an adhesive. By forming a through hole in the peripheral side wall of the bracket 7, the connector 6 is mounted to the peripheral side wall with an adhesive so as to pass therethrough to the outside from the inside of the bracket.

The frame 4 of the speaker unit 2 is molded out of resin. When the bracket 7 is molded, the frame 4 and the bracket 7 may be integrally molded. Alternatively, when the bracket 7 is molded, the connector 6 may be integrally formed with the bracket 7 by insert molding.

The back opening of the cylindrical bracket 7 is an engagement portion for the spacer 3a.

Like the bracket 7, the spacer 3a is also molded out of ABS resin or PP resin into a cylindrical shape.

Reference numeral 8 denotes a front portion of the spacer 3a. The front portion 8 forms an engaging portion which is internally fitted to the bracket 7 of the speaker unit 2 from the back opening of the bracket 7 and press-fitted to and engaged with the bracket 7. Reference numeral 9 denotes a connector slit that is formed in the front portion 8 of the spacer 3a for providing space for the connector 6 when the spacer 3a is internally fitted to the bracket 7.

The spacer 3a whose front portion 8 is press-fitted to the bracket 7 holding the speaker unit 2 from the back opening of the bracket 7 is formed with an outside diameter that allows it to be press-fitted.

A stepped portion 10a is provided at the outer peripheral side wall of the spacer 3a, and functions as a stopper when the spacer 3a is press-fitted to the bracket 7.

An end surface of a flange 10b at the back portion of the spacer 3a is formed with a shape that corresponds to the shape of an inner plate 20b to which the speaker assembly device for a door of a vehicle is mounted.

The device 1 is mounted in a vehicle door 20 (not shown). More specifically, as shown in FIG. 2, the flange 10b at the back portion of the spacer 3a of the device 1 opposingly contacts and is mounted to the inner plate 20b of the vehicle door 20, and the device 1 is interposed between the inner plate 20b and a door trim board 20c. In FIG. 2, reference numeral 20a denotes an outer plate, and reference numeral 21 denotes a window glass of the vehicle, which is formed so as to be movable in the directions of a double-headed arrow Y. Reference numeral 22 denotes a porous metallic plate, that is, a grill provided at a location facing a sound-releasing section of the speaker unit 2 of the drum trim board 20c. When the spacer 3a engages the bracket 7, the spacer 3a is relatively short, and the end surface of the flange 10b at the back portion of the spacer 3 is flat, so that the spacer 3a is mounted to a vehicle door whose interval T between the door trim board 20c and the inner plate 20b is small, that is, a vehicle door which is relatively thin, and whose inner plate 20b is flat.

FIGS. 3A to 3C are a sectional view, a perspective view, and an exploded perspective view, respectively, of a speaker assembly device for a door of a vehicle of an embodiment of the present invention when an inner plate 20b is curved. In the figures, reference numeral 1 denotes a speaker assembly device for a door of a vehicle. The device 1 comprises a common speaker unit 2, a bracket 7 for holding the speaker unit 2, and a spacer 3b that is designed and produced in accordance with a vehicle type to which the speaker for a door of a vehicle is mounted. The structures, shapes, and dimensions of the speaker unit 2 and the bracket 7 are the same as those of the speaker unit 2 and the bracket 7 of the speaker device for a door of a vehicle of the present invention shown in FIGS. 1A to 1C (and FIG. 2), so that they will not be mentioned below.

Like the spacer 3a, the spacer 3b has a shape and size that allow a front portion 8 thereof to be internally fitted to the bracket 7 of the speaker unit 2 from the back opening of the bracket 7 and to be press-fitted to and engaged with the bracket 7. In addition, a stepped portion 10a is provided at the outer peripheral side wall of the spacer 3b, and functions as a stopper when the spacer 3b is internally press-fitted to the speaker unit 2.

Since the inner plate 20b of a vehicle door 20 to which the device 1 for a door of a vehicle is mounted is curved in the form of a wave rather than being flat, an end surface of a flange 10b at the back portion of the spacer 3b is designed so as to be curved in the form of a wave in accordance with the shape of the inner plate 20b.

FIGS. 4A to 4C are a sectional view, a perspective view, and an exploded perspective view, respectively, of a speaker assembly device for a door of a vehicle of an embodiment of the present invention when an interval T between an inner plate 20b and a door trim board 20c is large. In the figures, reference numeral 1 denotes a speaker assembly device for a door of a vehicle. The device 1 comprises a common speaker unit 2, a bracket 7 for holding the speaker unit 2, and a spacer 3c that is designed and produced in accordance with a vehicle type to which the speaker assembly device for a door of a vehicle is mounted. The structures, shapes, and dimensions of the speaker unit 2 and the bracket 7 are the same as those of the speaker unit 2 and the bracket 7 of the speaker device for a door of a vehicle of the present invention shown in FIGS. 1A to 1C and FIG. 2, so that they will not be mentioned below.

Like the spacers 3a and 3b, the spacer 3c has a shape and size that allow a front portion 8 thereof to be internally fitted to the bracket 7 of the speaker unit 2 from the back of the bracket 7 and to be press-fitted to and engaged with the bracket 7. In addition, a forwardly facing stepped portion 10a is provided at the outer side of the spacer 3c, and functions as a stopper when the spacer 3c is internally press-fitted to the bracket 7 holding the speaker unit 2.

The dimension (length) of a portion behind the stepped portion 10a of the spacer 3c is set in accordance with, for example, the shape of a portion of the inner plate of the vehicle door (not shown) to which the device 1 for a door of a vehicle is mounted.

When the spacer 3c is engaged with the device 1 for a door of a vehicle, the spacer 3c is mounted to a vehicle door 20 (not shown) whose interval T between the inner plate 20b and the door trim board 20c is large, that is, a vehicle door 20 which is thick, and whose inner plate 20b is flat.

Accordingly, the device 1 for a door of a vehicle of the present invention is adapted for use in three types of vehicle doors by changing spacers 3, for example, the spacers 3a, 3b, and 3c, which are mounted to the bracket 7 holding one type of speaker unit 2, so that production costs of the speaker device for a door of a vehicle can be considerably reduced.

Figure 5A:
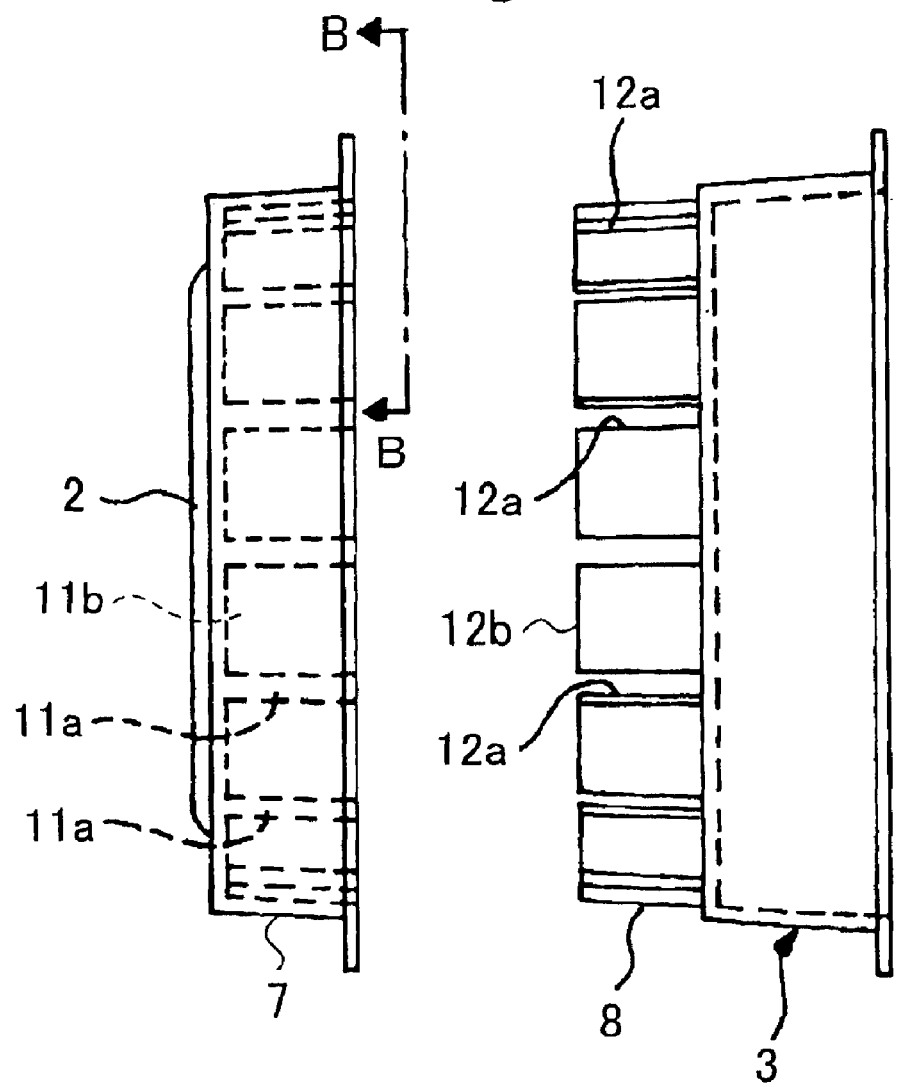
FIGS. 5A and 5B show a modification of the state of engagement of a holder and a spacer in the speaker assembly device for a door of a vehicle of the present invention.
Figure 5B:
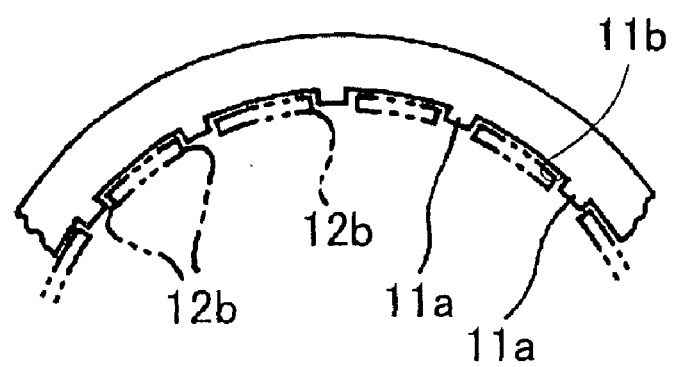

FIGS. 5A and 5B show a modification of the state of engagement of the bracket 7 and the spacer 3 of the speaker assembly device for a door of a vehicle of the present invention. FIG. 5A is an exploded side view thereof, and FIG. 5B is taken along a double-headed arrow B—B shown in FIG. 5A.

In the modification, a plurality of axially extending ribs 11a and recesses 11b disposed therebetween are formed at the inner peripheral surface of the bracket 7; a plurality of slits 12a and engaging portions 12b disposed therebetween are formed at equal intervals at, for example, the outer peripheral surface of the front portion 8 of the spacer 3; and the engaging portions 12b are fitted to the respective recesses 11b when the front portion 8 of the spacer 3 is fitted to the bracket 7.

By this, it is possible to increase mounting precision and to increase torsional strength.

Figure 6:
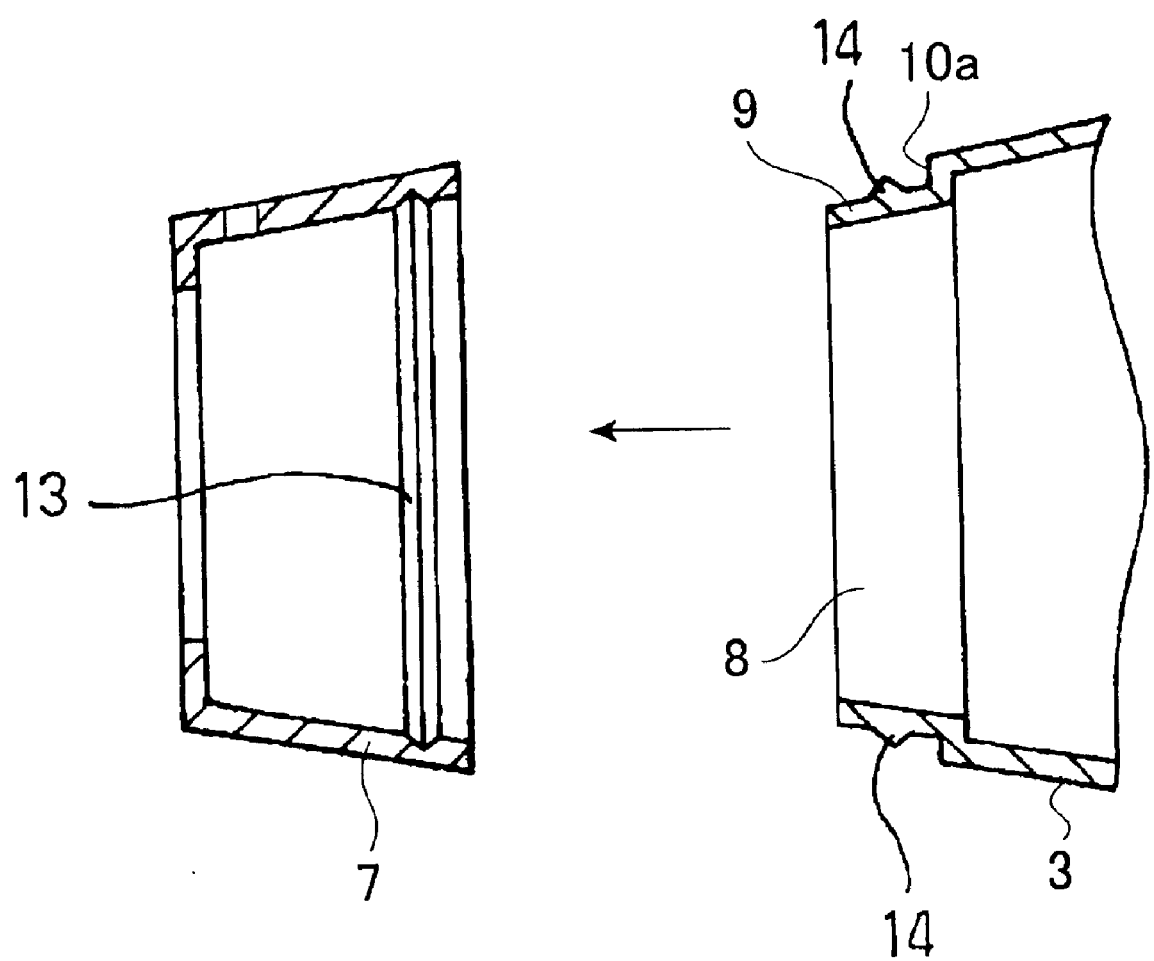
FIG. 6 is a sectional view illustrating another modification of the state of engagement of the holder and the spacer in the speaker assembly device for a door of a vehicle of the present invention.
Figure 7A:
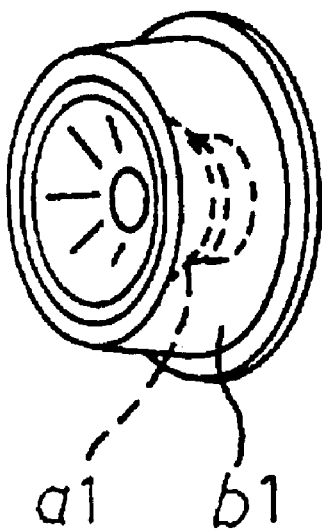
FIGS. 7A to 7C are perspective views of related examples of speakers.
Figure 7B:
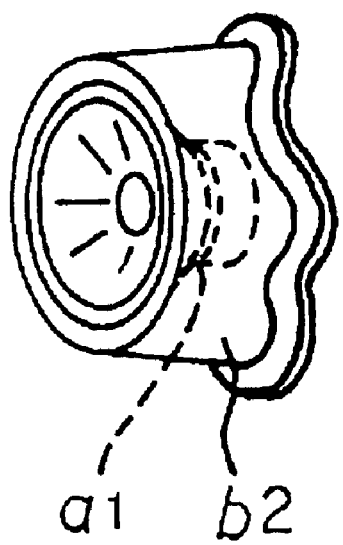
Figure 7C:
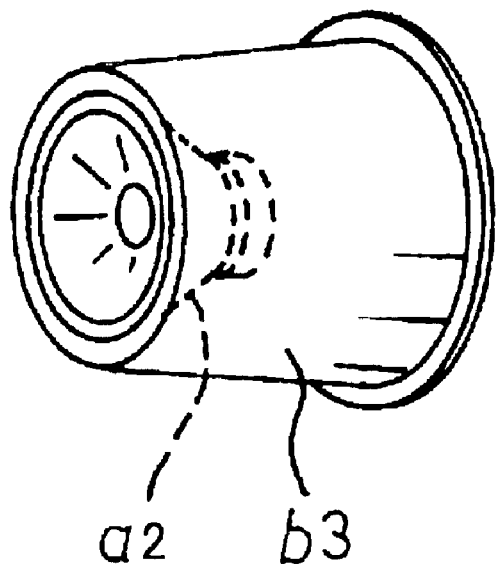

FIG. 6 shows another modification of the state of engagement of the engaging portion of the spacer 3 and the engagement portion of the bracket 7 of the speaker assembly device for a door of a vehicle of the present invention. An annular V-shaped groove 13 is formed in a portion of the inner peripheral wall near the back opening of the cylindrical bracket molded out of synthetic resin; a slightly protruding V-shaped protrusion 14 that is not very tall is integrally provided on the outer peripheral wall of the engaging portion of the front portion 8 of the cylindrical spacer 3 formed of synthetic resin; the engaging portion of the front portion 8 of the spacer 3 is forcefully press-fitted to the bracket 7 from the back opening of the bracket 7 in the direction of the arrow; and the V-shaped protrusion 14 is engaged with and mounted to the V-shaped groove 13. (FIG. 6 does not show the speaker unit and the connector.)

Although, in the above-described embodiments, the front portion 8 of the spacer 3 is internally fitted to the bracket 7, the bracket 7 and the spacer 3 do not have to be engaged in this way, so that it goes without saying that the bracket 7 may be internally fitted to the front portion of the spacer 3.

In this way, there are various forms of the speaker assembly device for a door of a vehicle of the present invention.

According to the speaker assembly device for a door of a vehicle and method for mounting a speaker for a door of a vehicle, the main portions including a common speaker unit and a holder for holding the speaker unit are provided, a plurality of types of spacers are provided, and spacers are changed in accordance with vehicle type. Therefore, it is possible to reduce production costs of the speaker assembly device for a door of a vehicle, so that costs can be reduced.

What is claimed is:

1. A speaker assembly device for a door of a vehicle, the device comprising:
    a speaker unit;
    a cylindrical holder having an opening at a front portion and an opening at a back portion thereof, the opening at the front portion having the speaker unit mounted therein; and
    a cylindrical spacer having an engaging portion at a front portion thereof, an opposingly contacting portion at a back portion thereof and an annular stepped portion located between the front portion and the back portion, the engaging portion being slidably engageable with the opening at the back portion of the holder, so that the annular stepped portion abuts an edge of the back portion of the holder and the opposingly contacting portion opposingly contacting an inner surface of the door of the vehicle.

2. The speaker assembly device for a door of a vehicle according to claim 1, further comprising a connector connected to a voice coil of the speaker unit and being mounted to a peripheral side portion of the holder.

3. The speaker assembly device for a door of a vehicle according to claim 2, wherein the front portion of the spacer has a slit for providing space for the connector.

4. A method for mounting a speaker to a door of a vehicle, the method comprising the steps of:
    providing a holder and mounting a speaker unit to a front portion thereof and forming an engagement portion at a back portion of the holder; and
    mounting the speaker to the door by selecting a spacer corresponding to a parameter of the door to which the speaker is to be mounted based on a type of the vehicle, and forming the spacer with an engaging portion that is slidingly engageable with the engagement portion of the holder and with a stepped portion abutting an edge of the back portion of the holder and an opposingly contacting portion opposingly contacting an inner surface of the door of the vehicle.

* * * * *